(12) United States Patent
Ashihara et al.

(10) Patent No.: US 8,394,044 B2
(45) Date of Patent: Mar. 12, 2013

(54) WALKING ASSIST DEVICE

(75) Inventors: Jun Ashihara, Wako (JP); Hiroshi Kudoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 12/377,944

(22) PCT Filed: Jul. 13, 2007

(86) PCT No.: PCT/JP2007/063986
§ 371 (c)(1),
(2), (4) Date: Feb. 18, 2009

(87) PCT Pub. No.: WO2008/023505
PCT Pub. Date: Feb. 28, 2008

(65) Prior Publication Data
US 2010/0069799 A1    Mar. 18, 2010

(30) Foreign Application Priority Data
Aug. 22, 2006  (JP) ................................. 2006-224802

(51) Int. Cl.
*A61F 5/00* (2006.01)
*A61H 3/00* (2006.01)
*A45B 1/00* (2006.01)
*A45B 7/00* (2006.01)
*A45B 9/00* (2006.01)
*A47D 13/04* (2006.01)

(52) U.S. Cl. ................. 602/16; 135/67; 135/65; 482/66

(58) Field of Classification Search .................... 602/16; 135/67, 65; 297/256.12, 5, 263.1; 482/66, 482/68
See application file for complete search history.

(56) References Cited

U.S. PATENT DOCUMENTS

| | | | | |
|---|---|---|---|---|
| 3,385,550 A | * | 5/1968 | Doerner | 248/417 |
| 4,861,051 A | * | 8/1989 | Napper | 280/87.021 |
| 4,872,665 A | * | 10/1989 | Chareire | 482/51 |
| 5,702,326 A | | 12/1997 | Renteria | |
| 6,056,673 A | | 5/2000 | Arrecis | |

FOREIGN PATENT DOCUMENTS

| | | |
|---|---|---|
| DE | 3620378 | 12/1987 |
| EP | 1 726 281 | 11/2006 |
| FR | 2 745 714 | 9/1997 |
| JP | 05-329186 | 12/1993 |
| JP | 07-112035 | 5/1995 |

(Continued)

*Primary Examiner* — Patricia Bianco
*Assistant Examiner* — Victoria J Hicks
(74) *Attorney, Agent, or Firm* — Rankin, Hill & Clark LLP

(57) ABSTRACT

The present invention provides a walking assist device including a seat member (1) where a user (P) sits astride; and a support member (2L, 2R) which is provided at a bottom side of the seat member (1); wherein the walking assist device includes a connection portion (106) which connects the seat member (1) to the support member (2L, 2R) in such a way that the seat member (1) is able to swing laterally around a spindle (106a) located at a middle portion of the anteroposterior width of the seat member (1) which the user (P) contacts. Therefore, the resistance force from the seat portion that the user (P) is subject to when the user (P) swings the hip to walk is reduced, thereby improving the usability of the walking assist device.

11 Claims, 6 Drawing Sheets

| | FOREIGN PATENT DOCUMENTS | | JP | 2005-169052 | 6/2005 |
|---|---|---|---|---|---|
| JP | 2001-095865 | 4/2001 | WO | 90/13273 | 11/1990 |
| JP | 2002-034717 | 2/2002 | | | |

* cited by examiner

WALKING ASSIST DEVICE

BACKGROUND OF THE INVENTION

1. Field of the Invention

The present invention relates to a walking assist device for assisting a user such as an aged person, a handicapped person who suffers from walking dysfunction or the like in walking.

2. Description of the Related Art

As a walking assist device for assisting a user such as an aged person or the like in walking, there has been disclosed one which has a saddle-shaped seat portion as a seat member where the user sits and can be moved when the user walks by sitting astride thereon in Japanese Patent Laid-open No. 3156367. The seat portion is mounted with a multi-jointed leg having a main leg and an assist leg disposed at both sides of the seat portion, respectively, as a support member for supporting the seat portion. Each of the main leg and the assist leg is made up of a multi-jointed mechanism having one or a plurality of joints. Each joint of the leg is provided with a joint driving mechanism including a driving motor, a reduction gear or the like.

With regard to the above-mentioned walking assist device having the seat portion, when the user is sitting astride on the seat portion and swings the hip so as to walk, for example, in a greater footstep, the user will be subject to a resistance force from the seat portion when the user tries to turn the pelvis. This is because the seat portion is located at an anteroposterior direction, therefore it feels heavy for the user to move the hip.

SUMMARY OF THE INVENTION

The present invention has been accomplished in view of the aforementioned problems. Therefore, it is an objective of the present invention to provide a walking assist device which by-reduces a resistance force that a user is subject to from a seat portion when the user swings the hip to walk, allowing improved usability thereof.

The walking assist device according to the present invention includes a seat member where a user sits astride; and a support member which is provided at a bottom side of the seat member; wherein the walking assist device includes a connection portion which connects the seat member to the support member in such a way that the seat member is able to swing laterally around a spindle located at a middle portion of the anteroposterior width of the seat member which the user contacts.

According to the walking assist device of the present invention, in cases where the user sits astride on the seat member and swings the hip to walk, the seat member follows the swing motion to swing laterally. Therefore, the resistance force from the seat portion that the user is subject to when the user swings the hip to walk is reduced, thereby improving the usability of the walking assist device.

In the walking assist device of the present invention, the support member includes a support frame which is located at the bottom side of the seat member for supporting the seat member through the connection portion in such a way that the seat member is able to swing laterally with respect to the support member; and the spindle of the connection portion is erected on the support frame and is rotatably engaged with a hole provided in the seat member.

Further, it is preferable that the connection portion includes a bias member for biasing the seat member back toward an original position thereof with respect to the support frame when the seat member is rotated laterally around the spindle.

In this case, when the user sits astride on the seat member and swings the hip to walk, the seat member swings laterally. The bias member biases the seat member back toward its original position. Therefore, the seat member will return to its original position, aligning in the anteroposterior direction. The usability for the user will be improved while assuring the stability of the seat member.

DETAILED DESCRIPTION OF THE PREFERRED EMBODIMENTS

A walking assist device of an embodiment of the present invention will be described hereinafter.

Figure 1:
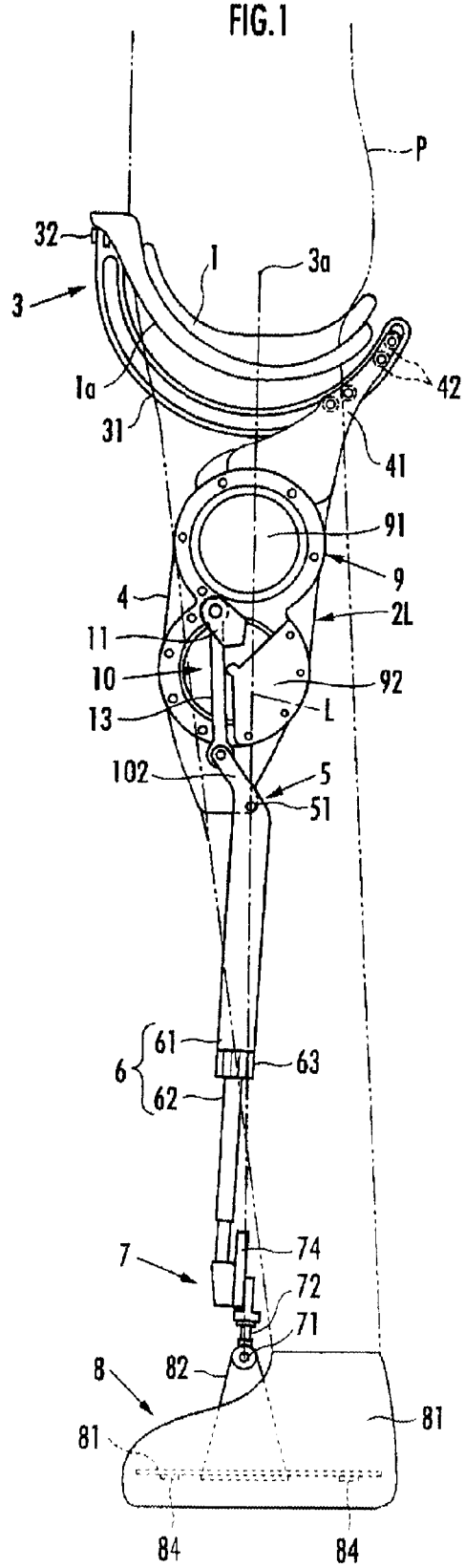
FIG. 1 is a perspective view of a walking assist device according to an embodiment of the present invention.
Figure 2:
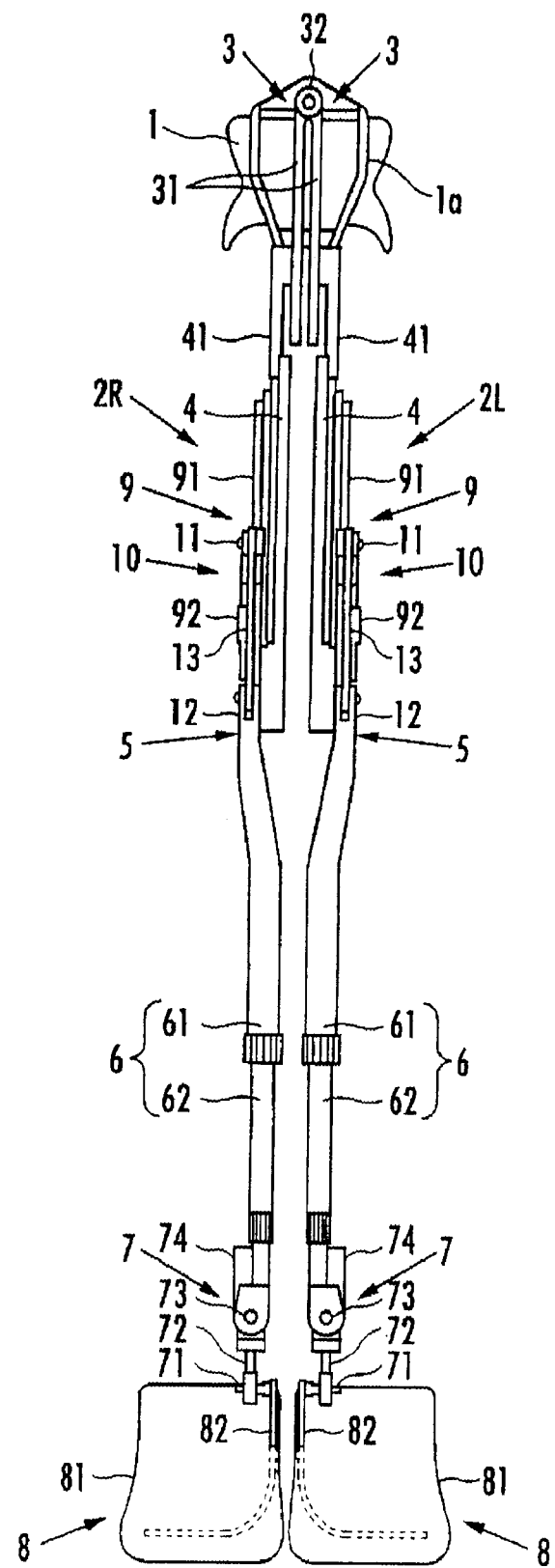
FIG. 2 is a side view of the walking assist device of the embodiment.
Figure 3:
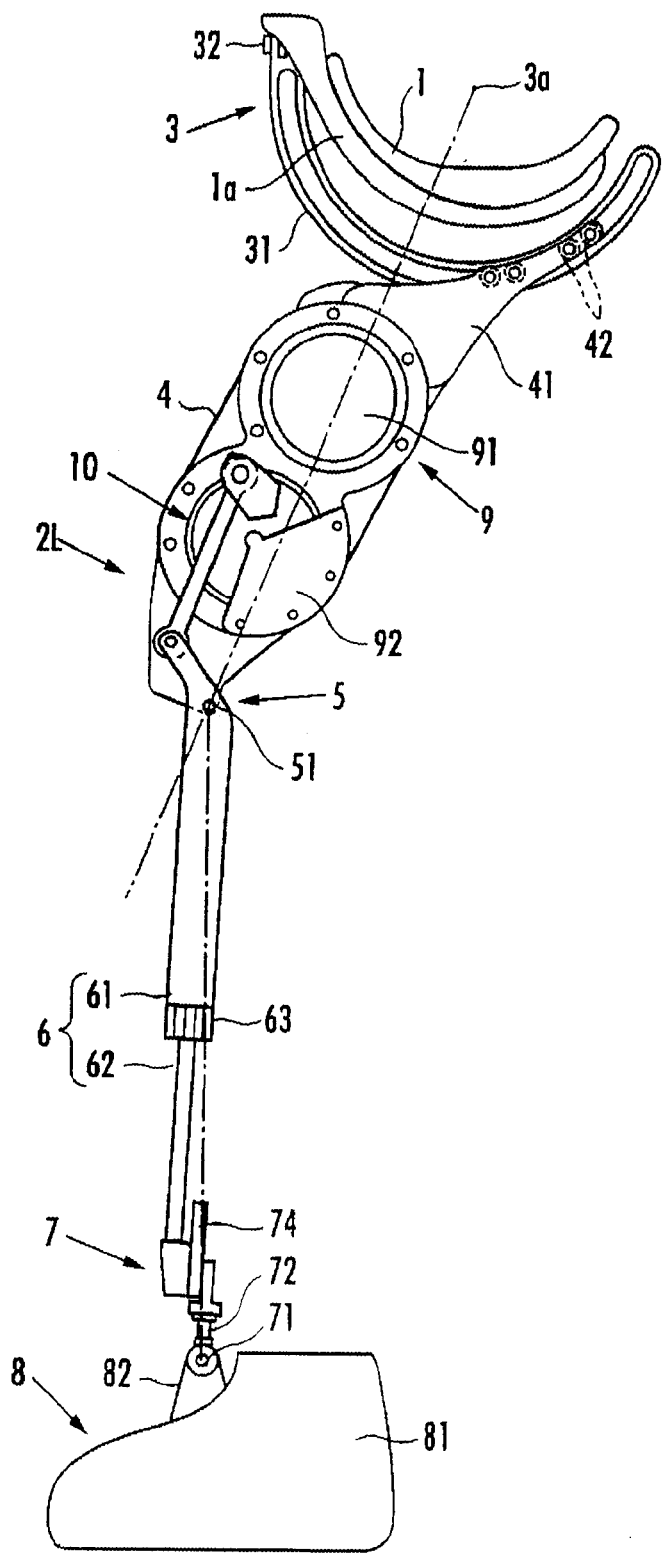
FIG. 3 is a front view of the walking assist device of the embodiment.

The walking assist device illustrated in FIGS. 1 to 3 includes a saddle-shaped seat member 1 which constitutes a seat portion where the user P sits astride, and a pair of leg links 2L and 2R at the left and right sides, respectively.

The leg links 2L and 2R are connected to a support frame 1a located at the bottom side of the seat member 1. The support frame 1a and the leg links 2L and 2R constitute a support member which supports the seat member 1. Detailed description on the seat member 1 will be given hereinafter.

Each of the leg links 2L and 2R is a link which can extend and flex freely, including an upper first link 4 which is connected to a first joint 3 disposed at the bottom side of the support frame 1a and a lower second link 6 which is connected to the lower end of the first link 4 via a second joint 5. The lower end of the second link 6 is connected, via a third joint 7, with a ground-attaching member 8 which is mounted to each of the left and right feet of the user P.

The second link 6 is telescopically formed from a cylindrical upper portion 61, and a lower portion 62 which is slidably inserted into the upper portion 61 and supported thereby at an arbitrary length adjusted by a lock nut 63. Accordingly, the length of the leg link can be adjusted according to a length of a leg of the user P.

Further, each of the leg links 2L and 2R are mounted with a driving source 9 for driving the second joint 5. According to the rotation of the second joint 5 driven by the driving source 9, a force is applied to each of the leg links 2L and 2R in a direction where a distance between the ground-attaching member 8 and the seat member 1 in each of the leg links 2L and 2R is lengthened, in other words, a direction where each of the leg links 2L and 2R is extended, to generate a support force for supporting at least apart of the user's body weight (hereinafter, referred to as "body weight relief assist force"). The body weight relief assist force generated in each of the leg links 2L and 2R is transferred to the trunk of the user P via the seat member 1 and the load on the leg of the user P is thereby reduced.

The user P can use the walking assist device according to the present embodiment merely by mounting the ground-attaching member 8 to the feet and sitting on the seat member 1. By doing so, the user experiences almost no constrained feeling. Further, the first joint 3 of the leg link 2R and the first link 4 are located under the crotch of the user P and therefore the user P does not hit his/her hands against the first joint 3 or the first link 4 when swinging his/her arms in walking, which allows free arm swing. Furthermore, the walking assist device is compact in size and may be used even in a small place, by which the usability is remarkably improved, over and above the reduction in constrained feeling and the secured free arm swing.

The first joint 3 of each of the leg links 2L and 2R is disposed at a location within a lateral width between the left and right thighbones of the user P when the user P is sitting on the seat member 1. Therefore, the body weight relief assist force acts on the seat member 1 between the left and right thighbones of the user P and is certainly transferred to the trunk of the user P.

In the present embodiment, the first joint 3 includes an arc-shaped guide rail 31 which is longitudinal in the anteroposterior direction provided at the bottom side of the seat member 1. Each of the leg links 2L and 2R is movably engaged with the guide rail 31 via a plurality of rollers 42 pivotally attached to a slider 41 which is fixed to the upper end of the first link portion 6. In this way, each of the leg links 2L and 2R swings in the anteroposterior direction around the center of curvature of the guide rail 31.

The center of curvature of the guide rail 31, namely a swing fulcrum 3a of the first joint 3 for each of the leg links 2L and 2R in the anteroposterior direction, is located above the seat member 1. Normally, if the user P tilts his/her upper body forward or the like to cause the action point of the body weight of the upper body of the user P to deviate forward of the anteroposterior swing fulcrum 3a of each of the leg links 2L and 2R with respect to the seat member 1, the seat member 1 inclines anteroinferiorly with respect to the user P. Moreover, the seat member 1 will deviate backward with respect to the user P if the seat member 1 continues to incline further. In the present embodiment, however, the action point of the body weight is displaced backward under the swing fulcrum 3a when the seat member 1 inclines anteroinferiorly and thereby an anteroposterior distance between the fulcrum 3a and the action point of the weight decreases, which thereby decreases the angular moment applied to the seat member 1. Thereafter, the angular moment applied to the seat member 1 becomes zero when the action point of the weight is displaced to the position beneath the swing fulcrum 3a, which is a stable state for the seat member 1. Since the seat member 1 automatically converges on the stable state as described above, it is possible to prevent the seat member 1 from deviating in the anteroposterior direction under the crotch of the user P.

Furthermore, the slider 41, which is located at the upper end of each of the leg links 2L and 2R, partially engages with the guide rail 31, which is located backward of a line L between the third joint 7 of each of the leg links 2L and 2R and the anteroposterior swing fulcrum 3a (the center of curvature of the guide rail 31). This secures a forward swing stroke of each of the leg links 2L and 2R that follows the forward swing motion of each leg of the user P without much increase in the length of the guide rail 31.

Figure 5:
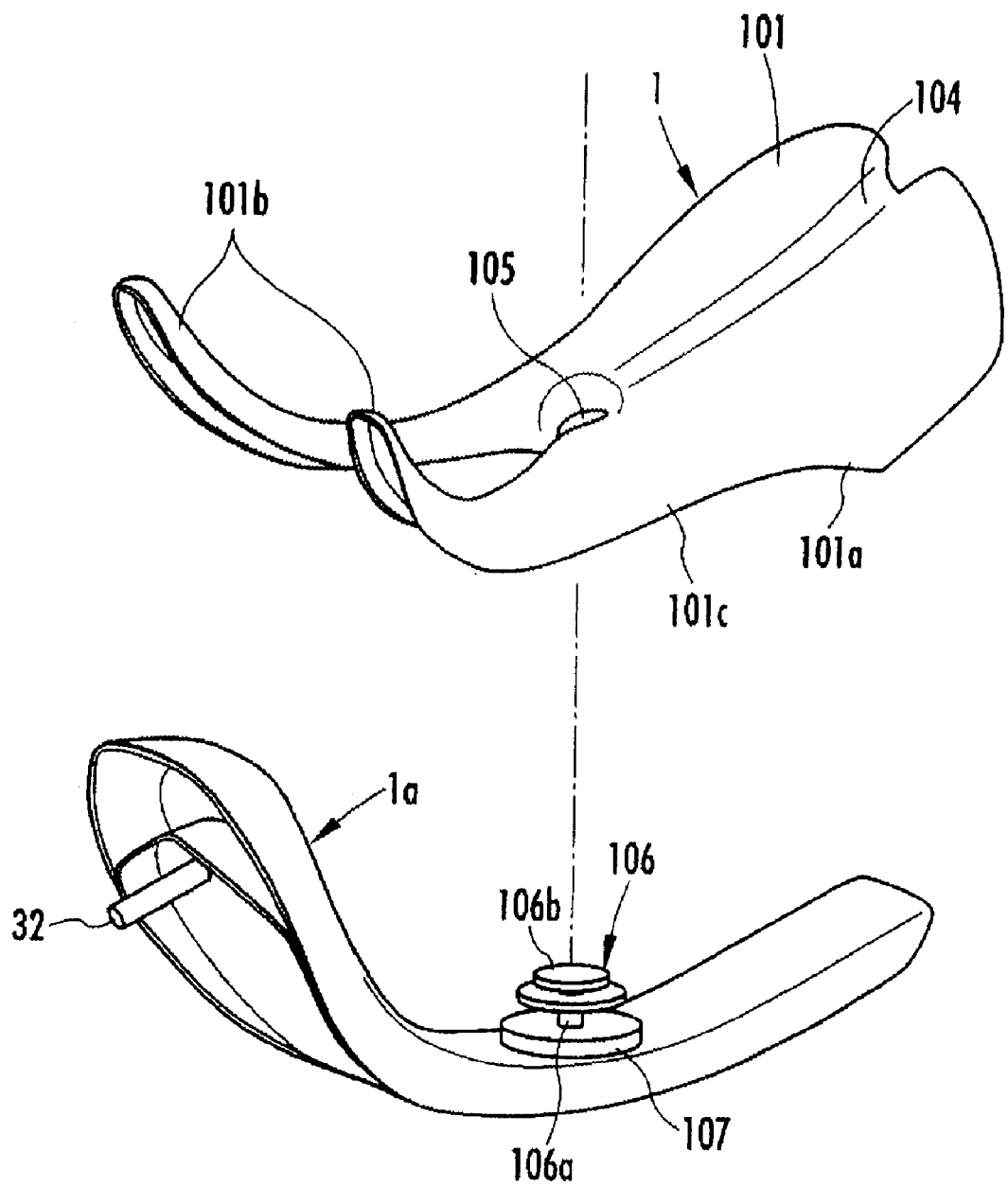
FIG. 5 is a perspective view illustrating the seat member and a support frame.

Furthermore, each guide rail 31 for each of the left and right leg links 2L and 2R is supported by the support frame 1a via an anteroposterior spindle 32 (refer to FIG. 5). Therefore, each guide rail 31 is connected to the seat member 1 so as to swing freely in the lateral direction with respect to the support frame 1a. The allowance of swing in the lateral enables the user P to abduct his/her legs.

In the present embodiment, the driving source 9 for the second joint 5 includes an electric motor 91 and a reduction gear 92 composed of a planetary gear mechanism. The second joint 5 is driven by the electric motor 91 via the reduction gear 92 and a power transmission mechanism 10. Specifically, the second joint 5 is formed with the upper end of the second link 6 pivotally attached to the lower end of the first link 4 via a joint shaft 51 disposed laterally. Furthermore, the power transmission mechanism 10 includes a first crank arm 11 which is provided on the output side of the reduction gear 92, a second crank arm 12 which extends upward from the joint shaft 51 and is integral to the second link 6, and a rod 13 which connects the crank arms 11 and 12 to each other. According thereto, the rotation output of the reduction gear 92 is transferred to the second crank arm 12 via the first crank arm 11 and the rod 13, the second link 6 swings around the joint shaft 51 with respect to the first link 4, and each of the leg links 2L and 2R is bent as illustrated in FIG. 3 from the extended state illustrated in FIG. 1.

Each ground-attaching member 8 has a shoe 81 and a joint member 82 protruding upward from the inside of the shoe 81. Moreover, the second link 6 of each of the leg links 2L and 2R is connected to the joint member 82 via the third joint 7. The third joint 7 is formed to be a three-axis structure having a first shaft 71 extending in the lateral direction, a second shaft 72 extending in the vertical direction, and a third shaft 73 (refer to FIG. 2) extending in the anteroposterior direction. In addition, the third joint 7 is incorporated with a two-axis force sensor 74. Note here that the above-mentioned body weight relief assist force is applied onto a line (hereinafter, referred to as a reference line) L between the anteroposterior swing fulcrum 3a of each of the leg links 2L and 2R in the first joint 3 and the first shaft 71 which is an anteroposterior swinging fulcrum of each of the leg links 2L and 2R in the third joint 7 in profile. Then, an actual weight relief assist force applied onto the reference line L (accurately, a resultant force between the weight relief assist force and a force generated by the weights of the seat member 1 and the leg links 5) is calculated based on detected values of forces in the two-axis direction detected by the force sensors 74.

Hereinafter, detailed descriptions will be given to the seat member 1 and the connection portion which supports the seat member 1 according to the present embodiment.

Figure 4:
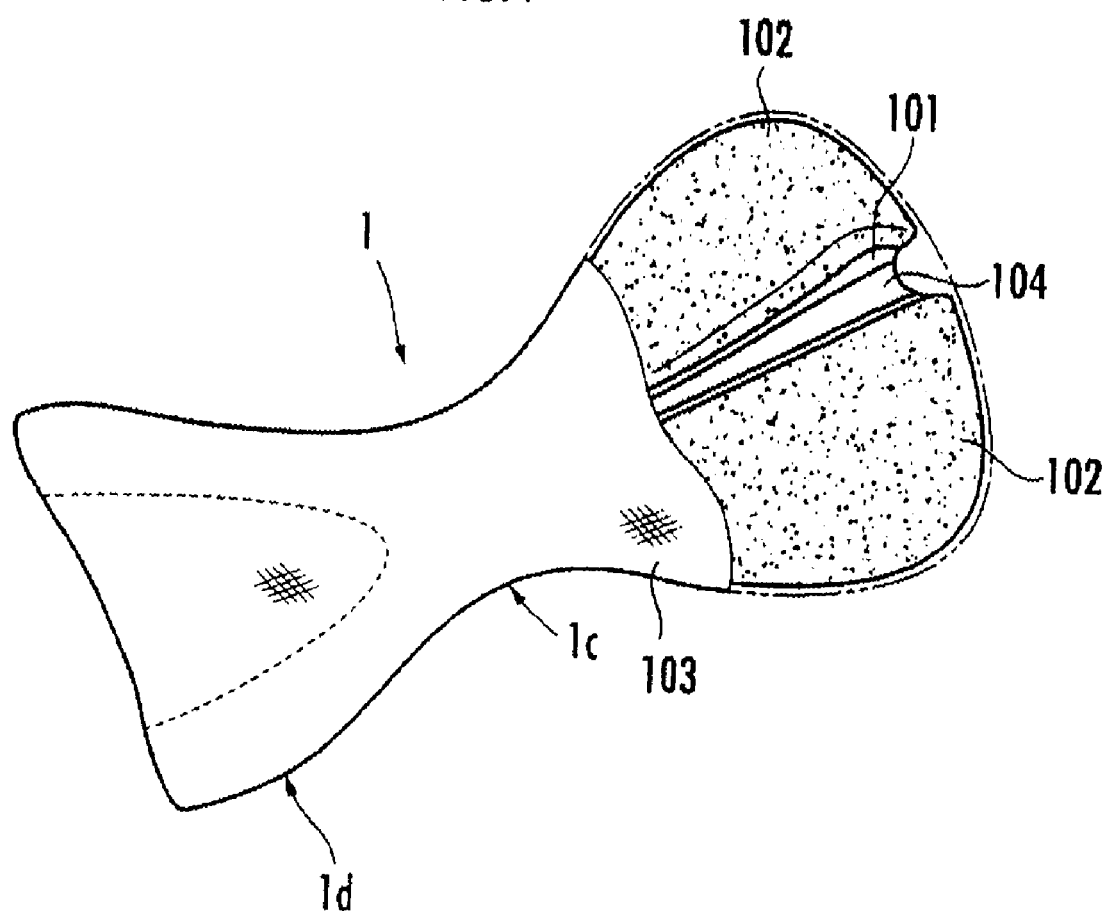
FIG. 4 is a perspective view of a seat member of the walking assist device of the embodiment.

As illustrated in FIG. 4, the seat member 1 constitutes a seat portion of a shape having a "constricted" part 1c which is narrower in lateral width than a front part and a rear part and is located therebetween in the middle along the anteroposterior direction. The front part 1d is formed by curving upward and has a wider lateral width. The rear part also has a wider lateral width. Therefore, the entirety of the seat member 1 having a U shape in profile enfolds the hips of the user P who is sitting thereon.

According to the present embodiment, the seat member 1 is composed of a core material 101 formed from carbon fiber or the like. The seat portion is formed by disposing a cushion material 102 on the core material 101 and covering the core material 101 and the cushion material 102 with a cover 103.

As illustrated in FIG. 5, the core material 101 includes a front part 101b, which is formed into a bifurcated shape by cutting out a middle part in the lateral direction; a constricted part 101c; a rear part 101a; and a groove or concave 104, which is formed in the middle of the lateral width on a face side, which is the upper surface of the core material 101 and extends from the front part 101b through the constricted part 101c to the rear part 101a. The cushion material 102 is attached to both sides of the concave 104. Further, the front part 101b is formed to have an arch shape in profile. Furthermore, a central part, which is the base of two bifurcated parts, is provided with a perforated hole 105 having a substantially circular shape. By fitting a discoid connection member 106, which will be described hereinafter, into the hole 105, the seat member 1 including the core material 101 is supported on the support frame 1a located above the leg links 2L and 2R serving as the support member.

A back side, which is the lower surface of the core material 101, is substantially flat from the lower end of the front part 101b, which is curved toward the face side, to the rear part 101a. The core material has a thin periphery, thereby absorbing a contact force produced when the legs contact the sides thereof due to its flexibility.

A front part of the support frame 1a extends upward and is formed with a curved shape. The central position of an upper end portion is provided with the spindle 32 protruding forward. A circular basis 107 is fit at a front surface of a central portion of the support frame 1a. On the circular basis 107, there is disposed a discoid connection member 106 which constitutes the connection portion.

Figure 6:
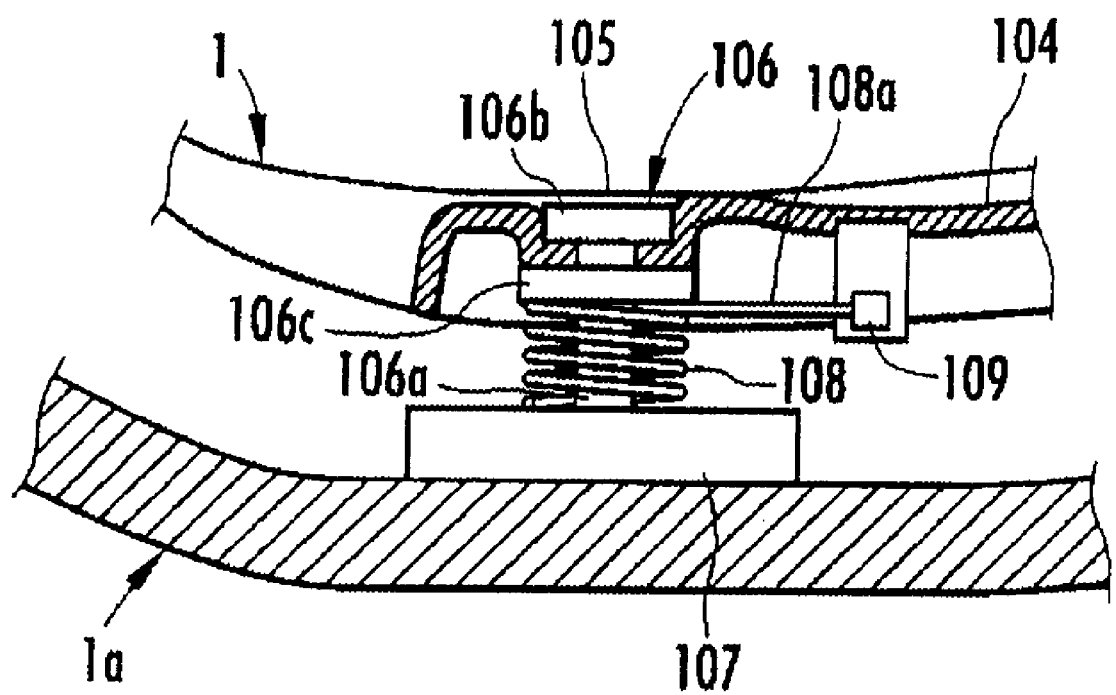
FIG. 6 is a partial perspective view illustrating a connection portion between the seat member and the support frame in FIG. 5.

As illustrated in FIG. 6, the connection member 106 is formed by erecting a cylindrical spindle 106a at the center of the basis 107 disposed on the support frame 1a; on the top end thereof, there are fixed two discoid members with mutually different diameter 106b and 106c disposed with a vertical separation in such a way that the discoid member 106b with a relatively smaller diameter is disposed at an upper location and the other discoid member 106c with a relatively greater diameter is disposed at a lower location.

To dispose the above-mentioned seat member 1 at the support frame 1a, the discoid member 106b located upper of the connection member 106 is pushed into the perforated hole 105 so as to enlarge the perforated hole 105 from the bottom side of the core material 101, the upper discoid member 106b and the lower discoid member 106c sandwich a circular periphery portion which is projected from the perforated hole 105 of the core material 101, thereby, the two discoid members 106b and 106c are embedded into the perforated hole 105. According thereto, the seat member 1 is supported on the support frame 1a in such a way that the seat member 1 can freely swing in a lateral direction or freely rotate around the spindle 106a.

A coil spring 108 which may girdle around the spindle 106a is filled between the discoid member 106c of the connection member 106 and the basis 107 on the support frame 1a. An upper end of the coil spring 108 is formed with a linear extension portion 108a extending backward along a bottom surface of the lower discoid member 106c. The tip end (back end) of the extension portion 108a is fixed at a fixation member 109 disposed by protruding from the bottom surface of the core material 101. Therefore, when the seat member 1 supported on the support frame 1a is rotated laterally around the spindle 106a of the connection member 106 by the movement of the hips of the user P who is sitting astride on the seat member 1, the linear extension portion 108a of the coil spring 108 serves as a restoration force to restore the seat member 1 to its original position. In other words, the coil spring 108 functions as a torsion spring, which is one example of a bias member, for biasing the seat member 1 which swings laterally to a restoration direction.

According to the configuration of the above-mentioned seat member 1 and the configuration of the connection portion which supports the seat member 1 to swing freely, in cases where the user P rotates his/her pelvis when the user P is sitting astride on the seat member 1 and swings his/her hip so as to walk, for example, in a greater footstep, or walks while swinging his/her hip, the seat member 1 rotates laterally on the support frame 1a around the spindle 106a of the connection member 106. In other words, the seat member 1 rotates laterally so as to follow the rotation movement of the pelvis of the user P; therefore, the resistance force from the seat portion that the user is subject to is reduced, thereby improving the usability of the walking assist device.

Further, the coil spring 108 provided in the connection portion as a bias member, is biased so as to have the aforementioned restoration force when the user P is sitting astride on the seat member 1 and swings his/her hip. In this instance, since the seat member 1 is held between the thighs of the user P, it will be biased by the restoration force of the coil spring 108 to return to the original position. Therefore, the seat member 1 will restore to the original position as aligning along the anteroposterior direction if the force for swinging the seat member 1 to the lateral direction is released. Accordingly, it is possible to assure the stability of the seat portion, providing a stable feeling to the user P who sits thereon.

According to the present embodiment, the user P sits on the seat member 1 covered with the cover 103 by putting two legs at both lateral sides of the constricted portion 1c, respectively, as illustrated in FIG. 1 and FIG. 3. In this instance, the front part 1d of the seat member 1 contacts the inguinal region of the user P; therefore, the seat member 1 is firmly maintained. As a result, the seat member 1 is prevented from deviating backward when the user P is walking.

The rear part of the seat member 1 is formed with a wider width than the middle constricted part 1c, which contacts the groin of the legs at the backside of the user's body; therefore, the seat member 1 can be prevented from deviating forward with respect to the user P. Furthermore, the rear part has a sufficient width (for example, a maximum of 120 mm) for seating the right and left ischia of the user P, the body weight relief assist force can be transferred through ischium-contacting to the user P reliably.

In the present embodiment, as aforementioned, the rear part and the front part of the seat member 1 are relatively wider, the user P is inhibited to deviate in the anteroposterior direction on the seat member 1; therefore, it is possible for the user P to sit thereon stably in the anteroposterior direction.

Further, the front part 101b of the core material 101 which constitutes the seat member 1 is formed to a bifurcated shape; therefore, the front part 1d of the seat member 1 has a small coefficient of elasticity in the left and right direction and is easy to bend in the lateral direction. Accordingly, even though a forward swung leg contacts the front part 1d of the seat member 1, the contact force can be absorbed via the bending of the front part 1d; thereby, inhibiting the seat member 1 from yawing when contacted by the legs.

Furthermore, each of the bifurcated parts of the front part 101b of the core material 101 has a cross section of an arch shape; therefore, the coefficient of elasticity in the anteroposterior direction is greater. Accordingly, the front part 101b is difficult to bend in the anteroposterior direction, preventing the seat member 1 from deviating backward with respect to the user P due to the bending of the front part 101b in the anteroposterior direction.

Even in cases where the front part 1d of the seat member 1 is not formed to a bifurcated shape, the same effect may be obtained by forming the front part 1d in such a way that the coefficient of elasticity in the anteroposterior direction is greater than that in the lateral direction.

As described above, the seat member 1 of the present embodiment improves the usability of the walking assist device by adapting a configuration on consideration of the contact state between the crotch of the sitting user P and the seat member 1 and the movement of the hip of the user P.

Although the present invention has been explained in relation to the preferred embodiments and drawings in the above, it is not limited thereto. It is also acceptable to connect a single leg link erected on a ground-contacting member, for example, a small sized pulley having a plurality of wheels, with a connection portion provided at a bottom side of a seat member. The single leg link may stand by itself. The wheels are driven in relation to the walking of the user.

Further, in the aforementioned embodiment, the first joint is formed to have a circular shaped guide rail and the upper end of each leg link is pivoted to the guide rail. It is also acceptable to form the first joint to a simple-structured joint having a lateral shaft where the upper end of each link is pivotally supported in such a way that each leg link can freely swing in the anteroposterior direction.

Furthermore, in order to assist a handicapped user whose one leg is crippled due to bone fracture or the like in walking, it is possible to leave only one leg link of the left and right leg links 2L and 2R in the above-mentioned embodiment corresponding to the crippled leg of the user by removing the other.

What is claimed is:

1. A walking assist device, comprising:
   a seat member adapted for a user to sit astride;
   a support frame provided at a bottom side of the seat member;
   at least one leg link movably connected to a lower surface of the support frame, the at least one leg link configured to be secured to a leg of the user; and
   a connection portion including a spindle erected on an upper surface of the support frame, the spindle rotatably connecting the seat member to the support frame such that the seat member is able to swing laterally around the spindle relative to the support frame, the spindle connecting with the seat member at a middle portion of an anteroposterior width of the seat member,
   wherein
   the walking assist device is configured to assist a user in walking while the user is sitting astride the seat member and standing substantially upright,
   a hole is provided through the seat member,
   the connection portion includes an upper discoid member and a lower discoid member, the upper and lower discoid members are integrated with the spindle and spaced from one another along the spindle, and the connection portion connects to the seat member with the spindle received in the hole provided through the seat member and the upper and lower discoid members sandwiching a portion of the seat member surrounding the hole provided through the seat member, and
   the hole is defined entirely through the seat member, and the upper discoid member directly abuts an upper surface of the seat member.

2. The walking assist device according to claim 1, wherein the seat member has a constricted part centrally disposed in a length direction of the seat member between a seat member front part and a seat member rear part, the constricted part having a width which is less than that of the seat member front part and the seat member rear part.

3. The walking assist device according to claim 2, wherein the seat member front part is formed in a bifurcated shape.

4. The walking assist device according to claim 1, wherein the connection portion includes a spring bias member for biasing the seat member back toward an original position thereof with respect to the support frame when the seat member is rotated laterally around the spindle, the spring bias member coiled around the spindle, directly connected at a first end to the seat member, and connected at a second end to the support frame.

5. The walking assist device according to claim 1, wherein the at least one leg link is connected to the support frame via a joint, said joint connecting to the support frame at a position under a portion of the seat member configured to receive a crotch of the user when the user is sitting astride the seat member.

6. The walking assist device according to claim 1, further comprising a driving source for driving the at least one leg link.

7. The walking assist device according to claim 1, wherein the connection portion includes a spring bias member for biasing the seat member back toward an original position thereof with respect to the support frame when the seat member is rotated laterally around the spindle,
   the spring bias member: coiled around the spindle at a position between the support frame and the lower discoid member; directly connected at a first end to the seat member; and connected at a second end to the support frame.

8. A seat for a walking assist device, comprising:
   a seat member adapted for a user to sit astride;
   a support frame configured to have at least one leg link movably connected thereto; and
   a connection portion rotatably connecting the seat member to the support frame such that the seat member is rotatable about the connection portion relative to the support frame,
   wherein
   the connection portion includes a spindle attached at a spindle first end to the support frame, an upper discoid member integrated with the spindle at a spindle second end, the spindle second end being opposite to the spindle first end, and a lower discoid member integrated with the spindle at a position spaced from the upper discoid member along the spindle,
   the seat member has a hole defined therethrough, the hole surrounded by a seat member periphery portion,
   the spindle of the connection portion is received in the hole defined through the seat member such that the upper discoid member and lower discoid member sandwich the seat member periphery portion surrounding the seat member hole, and
   the hole is defined entirely through the seat member, and the upper discoid member directly abuts an upper surface of the seat member.

9. The seat for the walking assist device according to claim 8, wherein the seat member has a constricted part centrally disposed in a length direction of the seat member between a seat member front part and a seat member rear part, the constricted part having a width which is less than that of the seat member front part and the seat member rear part.

10. The seat for the walking assist device according to claim 9, wherein the seat member front part is formed in a bifurcated shape.

11. The seat for the walking assist device according to claim 8, wherein the connection portion includes a spring bias member for biasing the seat member back toward an original position thereof with respect to the support frame when the seat member is rotated laterally around the spindle,
    the spring bias member: coiled around the spindle at a position between the support frame and the lower discoid member; directly connected at a first end to the seat member; and connected at a second end to the support frame.

* * * * *